Nov. 25, 1952  A. BECHLER  2,618,841
AUTOMATIC TURRET LATHE
Filed Dec. 17, 1948  2 SHEETS—SHEET 2

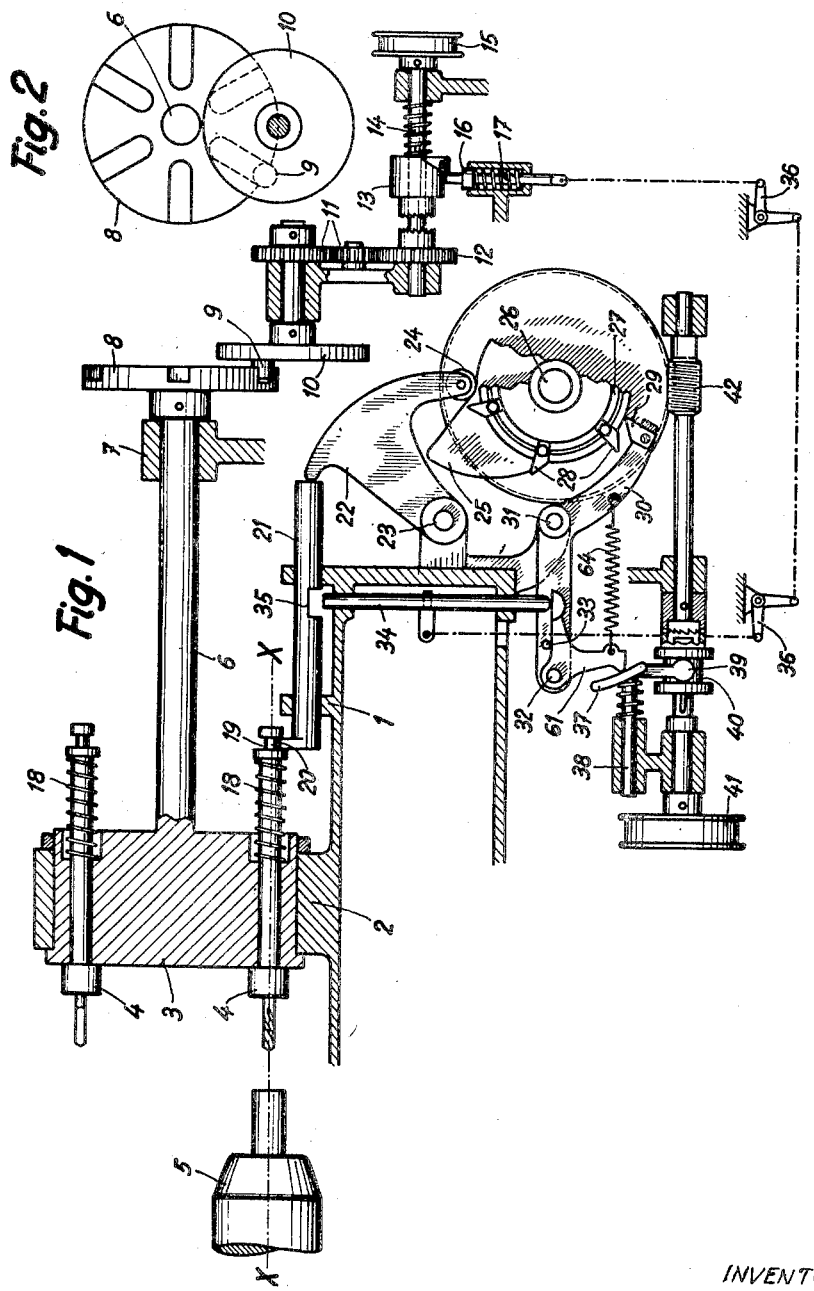

INVENTOR:
ANDRÉ BECHLER
BY K. A. Mayr
ATTORNEY.

Patented Nov. 25, 1952

2,618,841

UNITED STATES PATENT OFFICE 2,618,841

AUTOMATIC TURRET LATHE

André Bechler, Moutier, Switzerland

Application December 17, 1948, Serial No. 65,913
In Switzerland January 23, 1948

6 Claims. (Cl. 29—41)

This invention relates to automatic lathes having a cylindrical tool carrier the axis of which is parallel to the turning axis of the lathe and on which the several tools are brought into operative position by a periodically actuated indexing mechanism. It is very important that the indexing mechanism be immobilized in case of any trouble, which circumstance becomes mostly expressive in that the tool does not come back into its rest position, which is the start position for indexing.

The invention relates more particularly to automatic lathes of the above mentioned kind, in which the means for driving the indexing mechanism comprise a clutch, and the primary object of the invention is to provide for a safety device controlled by the operative tool and adapted to prevent said clutch from being put into its operative condition until the tool has come back into its rest position.

Another object of this invention is to provide for a feeler incorporated to said device, the position of the feeler depending on that of the tool and the feeler being mechanically connected to a control lever pertaining to the indexing mechanism.

Other objects of this invention will appear hereinafter as the description of the invention proceeds, the novel features, combinations and construction being more particularly pointed out in the specification and the claims hereunto appended.

The accompanying drawing represents, by way of example, and rather diagrammatically, an embodiment of the automatic lathe according to the invention, but only to such an extent as is necessary to make the invention easily understandable.

Fig. 1 is a view of the general disposition;

Fig. 2 is an end elevation of certain details of the indexing mechanism and

Figure 3:
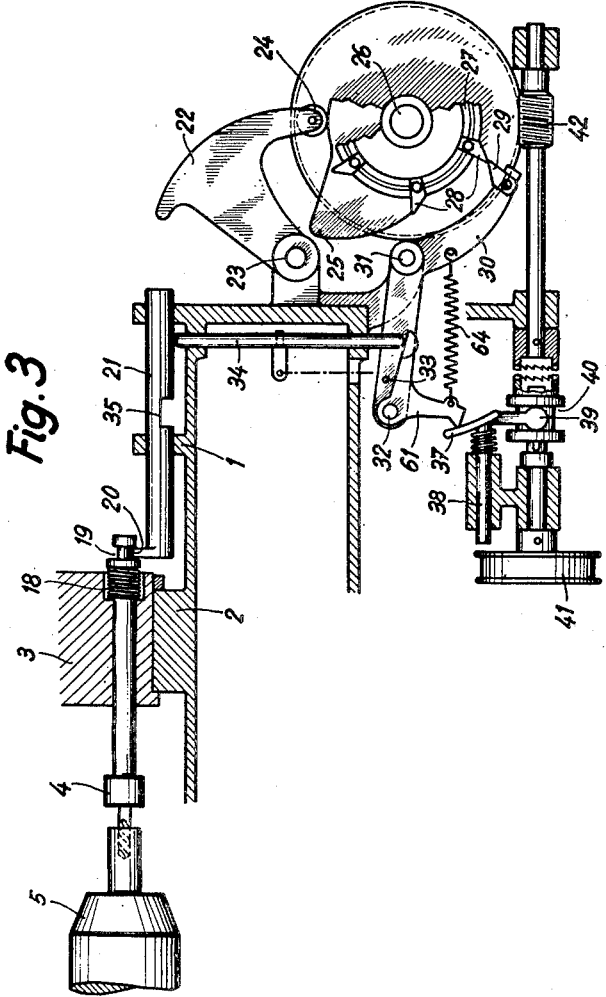
Fig. 3 is a view similar to that of Fig. 1, with certain parts occupying another position than in Fig. 1.

In the embodiment represented in the drawing, the bed of the automatic lathe is designated by 1 and carries a bearing 2 for the revolving cylindrical tool box or carrier 3. The latter is adapted for carrying six tools 4, two of which only are shown in the drawing, especially one in alignment with the turning axis $x$—$x$ of the lathe, on which the work piece 5 is rotated.

The tool box shaft 6 revolves in a bearing 7 which carries at its end opposite to the tool box a wheel 8 of a maltese cross gearing to which pertains also a pin 9 fixed to a disc 10. This disc is operatively connected by a gearing 11 to the driven part 12 of a coupling the driving part 13 of which is keyed on a driving shaft 14 having a pulley 15 secured to it. A control pin 16 loaded by a spring 17 cooperates with the clutch incorporated to the indexing mechanism in a manner well known to those skilled in the art relating to machine tools, for example to presses, so that the clutch may be put in operation at will to rotate the driven part by substantially one revolution, and is disengaged thereafter.

The tools 4 are pushed back into their rest position by means of springs 18. They possess a circular groove 19 adapted to be engaged by a nose 20 provided at one end of a plunger 21 when the respective tool is brought into alignment with the turning axis $x$—$x$ at the end of an indexing movement of the tool box 3. The other end of the plunger 21 is in contact with one arm of a bell crank lever 22 rotatably mounted on a pivot 23 secured to the machine frame. The other arm of said bell crank lever 22 carries a roller 24 adapted for cooperation with the contour of a cam disc 25 fixed to a camshaft 26. The latter carries also a disc 27 shown in part only, to which drivers 28 are secured in a number equal to that of the tools 4 and of the cams on the disc 25. These drivers 28 cooperate in sequence with a similar driver 29 fixed to one end of an indexing lever 30 rotatably mounted on a pivot 31 pertaining to the machine frame. On a pivot 32 fixed to the other end of the indexing lever 30, a tipper lever 61 is mounted, which is loaded by a coil spring 64 and thereby pressed against a stop 33 solid with the lever 30. One of the arms of the tipper lever 61 supports a feeler 34 the upper end of which normally faces a recess 35 of the plunger 21. Said feeler 34 is also operatively connected with the control pin 16 by means of a system of rods and levers 36. The other arm of the tipper lever 61 is constantly in contact with an inclined surface 37 of a guiding bar 38 made in one piece with a coupling pin 39 engaging the control groove 40 of a claw clutch which is operative to connect a driving pulley 41 with a worm gear 42 having its wheel fixed to the cam shaft 26.

When the machine tool works normally, i. e., when the tool aligned with the turning axis $x$—$x$ of the lathe is normally returned in its rest position together with the plunger 21, a driver 28 acting thereafter on the driver 29 will rock the indexing lever 30 in a clockwise direction (Fig. 1) and thereby lift the feeler 34 by means of the tipper lever 61. The upward movement of the feeler 34 is permitted by the recess 35 and transmitted by the system of rods and levers 36 to the control pin 16 of the clutch 12, 13, which is thus made operative and provokes the rotation of the disc 10 by one revolution and of the wheel 8 by a sixth of one revolution. Owing to such an indexing, another tool 4 is brought into alignment with the turning axis $x$—$x$. As long as the machine tool works normally, this sequence of movements is repeated, each tool brought into alignment with the turning axis being urged against the work piece by means of the cam 25 and the bell crank lever 22. If there is any trouble, i. e., if for example the working tool is jammed in the work piece and thereby prevented from being urged back into its rest position by the spring 18, the plunger 21 occupies the position shown in Fig. 3. Thus, the feeler 34 is prevented from rendering the clutch 12, 13 operative, for, in lieu of being lifted by a driver 28 acting upon the driver 29 and rocking the indexing lever 30, its upper end abuts against the plunger 21. The swinging of the indexing lever 30, therefore, provokes a rocking of the tipper lever 61 against the pull of the spring 64. The tipper lever 61, by acting upon the inclined surface 37 of the bar 38, provokes by means of the pin 39 the uncoupling of the claw clutch which, up to this moment, has operatively connected the driving pulley 41 with the worm gear 42. As a result, the machine, or at least the parts thereof which are responsible for the movements of the tools, are put out of operation. The operator may then remedy the trouble and set the machine again into action.

While I have described and illustrated one embodiment of my invention, I do not wish to unnecessarily limit the scope of this invention, but reserve the right to make such modifications and rearrangements of the several parts as may come within the purview of the accompanying claims.

What I claim is:

1. In an automatic lathe, a rotatable tool carrier, an indexing mechanism therefor including a first clutch, tool holders reciprocable in said tool carrier, a mechanism for advancing each tool holder after it has been indexed into its work position, spring means for retracting each so advanced tool holder into its retracted position, a second clutch interposed in said advancing mechanism and normally held operative; said advancing mechanism comprising a member engaged by a tool holder in operating position, and clutch actuating means including feeler means engaged by said member and responsive to the position of said tool holder, said actuating means being connected with said first clutch for engaging same upon return of said tool holder to retracted position and connected with said second clutch for disengaging same upon failure of said tool holder to return to retracted position.

2. An automatic lathe comprising a rotatable tool carrier, an indexing mechanism for said carrier, a first clutch connected with and controlling operation of said indexing mechanism, a plurality of tool holders individually reciprocably supported by said carrier, a second clutch, a mechanism connected with and controlled by said second clutch for advancing an indexed tool holder toward the work, a spring means connected with each tool holder for retracting it to rest position; said advancing mechanism comprising a reciprocable member engaged by a tool holder in indexed position, an intermediate movable member periodically engaged and moved by said advancing mechanism when said tool holder should be in retracted position, feeler means engaged by said reciprocable member and responsive to the position of said tool holder, said feeler means being resiliently connected with said intermediate member, clutch actuating means connected with said feeler means and with said first clutch for engaging same upon proper return of the indexed tool holder to retracted position, said clutch actuating means being also connected with said second clutch for disengaging same upon failure of the indexed tool holder to return to retracted position.

3. An automatic lathe according to claim 2, said first clutch being adapted to disengage itself after having rotated said tool carrier by one indexing step.

4. In an automatic lathe comprising a rotatable tool carrier, an indexing mechanism therefor including a first clutch and control means therefor, tool holders reciprocable in said tool box, a second clutch, a mechanism normally operated by means of said second clutch for advancing the tool holder occupying the work position, said advancing mechanism including a rotary cam, a reciprocable plunger having a recess and operatively interconnecting the tool holder occupying the work position with said rotary cam, helicoidal spring means on each tool holder, for shifting the tool holder and the plunger back into their retracted position after their advance movement, a safety device including cam means integral with said rotary cam, a cam lever adapted to be swung by said cam means when said rotary cam travels through a position corresponding to the retracted position of the previously advanced tool holder, a stop fixed on said cam lever, a tilting lever pivotally mounted on said cam lever and including a first arm having a tip and a second arm, a spring urging said second arm against said stop, a feeler rod reciprocable in a direction substantially perpendicular to said plunger, said rod having one of its ends supported by said second arm and the other end located to enter said recess when the plunger is in retracted position and when said cam lever is actuated by said cam means, said rod abutting a plunger portion outside of said recess, when the plunger has not reached its retracted position, thereby rocking said tilting lever on said cam lever, link means interconnecting said feeler rod with the control means of said first clutch to engage the latter when said feeler rod enters said recess, spring urged actuator means normally maintaining engagement of said second clutch and having a surface abutting said tip, to allow said tilting lever to act by said tip on said actuator means upon being rocked on said cam lever, for disengaging said second clutch.

5. An automatic lathe according to claim 4, said first clutch being adapted to disengage itself after having rotated said tool carrier by one indexing step.

6. An automatic lathe according to claim 5, said actuator means being mounted for slide movement in its longitudinal direction and said surface extending substantially along an arc of a circle the centre of which coincides with the centre of rotation of said cam lever, and at a substantial angle to said longitudinal direction.

ANDRE BECHLER.

REFERENCES CITED

The following references are of record in the file of this patent:

UNITED STATES PATENTS

| Number | Name | Date |
|---|---|---|
| 1,063,744 | Seward | June 3, 1913 |
| 1,453,732 | Stevens | May 1, 1923 |
| 1,981,147 | Moller | Nov. 20, 1934 |

FOREIGN PATENTS

| Number | Country | Date |
|---|---|---|
| 685,111 | Germany | Dec. 12, 1939 |